(12) United States Patent
Fang et al.

(10) Patent No.: US 8,997,244 B2
(45) Date of Patent: Mar. 31, 2015

(54) AUTOMATIC SOFTWARE AUDIT SYSTEM AND ASSOCIATED METHOD

(71) Applicant: Quanta Computer Inc., Tao Yuan Shien (TW)

(72) Inventors: Tien-Chin Fang, Taoyuan County (TW); Chen-Chung Lee, Nantou County (TW); Ping-Chi Lai, Tao Yuan Shien (TW); Chia-Hung Lin, New Taipei (TW); Cheng-Yao Wang, Tao Yuan Shien (TW); His-Chieh Hsu, Tao Yuan Shien (TW); Mei-Jung Wang, Tao Yuan Shien (TW); Hung-Yu Yang, Changhua County (TW); Wei-Chi Tai, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 92 days.

(21) Appl. No.: 13/740,152

(22) Filed: Jan. 11, 2013

(65) Prior Publication Data

US 2014/0130176 A1 May 8, 2014

(30) Foreign Application Priority Data

Nov. 6, 2012 (TW) ................................ 101141142

(51) Int. Cl.
*H04L 29/06* (2006.01)
*G06F 21/10* (2013.01)

(52) U.S. Cl.
CPC ..................................... *G06F 21/10* (2013.01)
USPC .................... 726/26; 713/187; 726/22; 726/1

(58) Field of Classification Search
CPC ....................................................... G06F 21/10
USPC ............................................................ 726/26
See application file for complete search history.

(56) References Cited

U.S. PATENT DOCUMENTS

| | | | |
|---|---|---|---|
| 7,546,595 B1 * | 6/2009 | Wickham et al. | 717/168 |
| 7,796,287 B2 * | 9/2010 | Fukuta | 358/1.15 |
| 8,868,721 B2 * | 10/2014 | Boggs et al. | 709/224 |
| 2001/0023486 A1 * | 9/2001 | Kayashima et al. | 713/200 |
| 2003/0140266 A1 * | 7/2003 | Fink et al. | 714/1 |
| 2005/0138383 A1 * | 6/2005 | Vainstein | 713/178 |
| 2005/0144591 A1 * | 6/2005 | Banks | 717/122 |
| 2006/0265337 A1 * | 11/2006 | Wesinger, Jr. | 705/65 |
| 2007/0136814 A1 * | 6/2007 | Lee et al. | 726/25 |
| 2007/0198429 A1 * | 8/2007 | Coley et al. | 705/59 |
| 2008/0148410 A1 * | 6/2008 | Wilson | 726/26 |
| 2008/0222732 A1 * | 9/2008 | Caldwell et al. | 726/26 |
| 2009/0158438 A1 * | 6/2009 | Pichetti et al. | 726/26 |
| 2009/0228984 A1 * | 9/2009 | Sterin | 726/26 |

* cited by examiner

*Primary Examiner* — Mohammad L Rahman
(74) *Attorney, Agent, or Firm* — Rabin & Berdo, P.C.

(57) ABSTRACT

An automatic software audit system includes a client and a server. The client includes a network interface, a software installation record database, a software audit rule database, a software release database and a central processing unit (CPU). The network interface is coupled to the client. The software installation record databases stores a software installation record of the client. The software audit rule database stores a software audit rule. The software release database stores a software release record of the client. The CPU installs an agent program to the client to collect the software installation record, and generates a software audit result of the client according to the software installation record, the software audio rule and the software release record.

24 Claims, 3 Drawing Sheets

AUTOMATIC SOFTWARE AUDIT SYSTEM AND ASSOCIATED METHOD

This application claims the benefit of Taiwan application Serial No. 101141142, filed Nov. 6, 2012, the subject matter of which is incorporated herein by reference.

BACKGROUND OF THE INVENTION

1. Field of the Invention

The invention relates in general to an audit system and associated method, and more particularly to an automatic software audit system and associated method.

2. Description of the Related Art

Accompanied with fast advancements of computer technologies, various kinds of applications are developed. As computers carrying all kinds of application software further promote the prevalence of computers in implementations of many aspects, computers are involved in almost all commercial activities. Application software utilized by common enterprises is extremely diversified. In common enterprises, on top of official document management systems, application software utilized may also include statistical software for statistical staff, accounting systems for accounting staff and graphics software for graphics staff. It is a common occurrence that application software of different functions is provided within a same company or even within a same department.

With a growing number of company staff, it is difficult for a conventional manual audit approach to ensure that everyone utilizes legal software. In the current world where intellectual properties are valued with great importance, illegal use of piracy software may be devastating to company reputations. Therefore there is a need for a solution that effectively audits software utilized in a company.

SUMMARY OF THE INVENTION

The disclosure is directed to an automatic software audit system and associated method.

According to the disclosure, an automatic software audit system is provided. The automatic software audit system includes a client and a server. The server includes a network interface, a software installation record database, a software audit rule database, a software release database, and a central processing unit (CPU). The network interface is coupled to the client. The software installation record database stores a software installation record of the client. The software audit rule database stores a software audit rule. The software release database stores a software release record of the client. The CPU installs an agent program to the client to collect the software installation record, and generates a software audit result of the client according to the software installation record, the software audit rule and the software release record.

According to the disclosure, an automatic software audit method is further provided. The automatic software audit method includes steps of: storing a software release record of a client to a software release database of a server; storing a software audit rule to a software audit rule database of the server; installing an agent program to the client to collect a software installation record of the client, and storing the software installation record to a software installation record database of the server; and generating a software audit result of the client according to the software installation record, the software audit rule and the software release record.

The above and other aspects of the invention will become better understood with regard to the following detailed description of the preferred but non-limiting embodiments. The following description is made with reference to the accompanying drawings.

DETAILED DESCRIPTION OF THE INVENTION

First Embodiment

Figure 1:
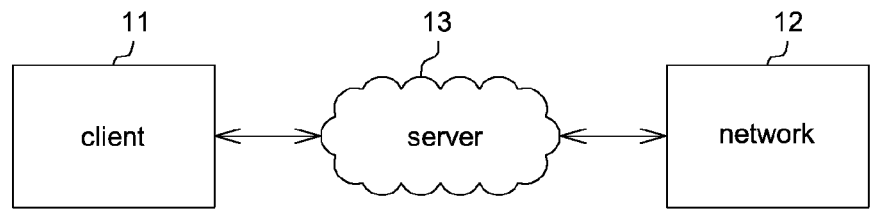
FIG. 1 is a schematic diagram of an automatic audit system according to a first embodiment.
Figure 2:
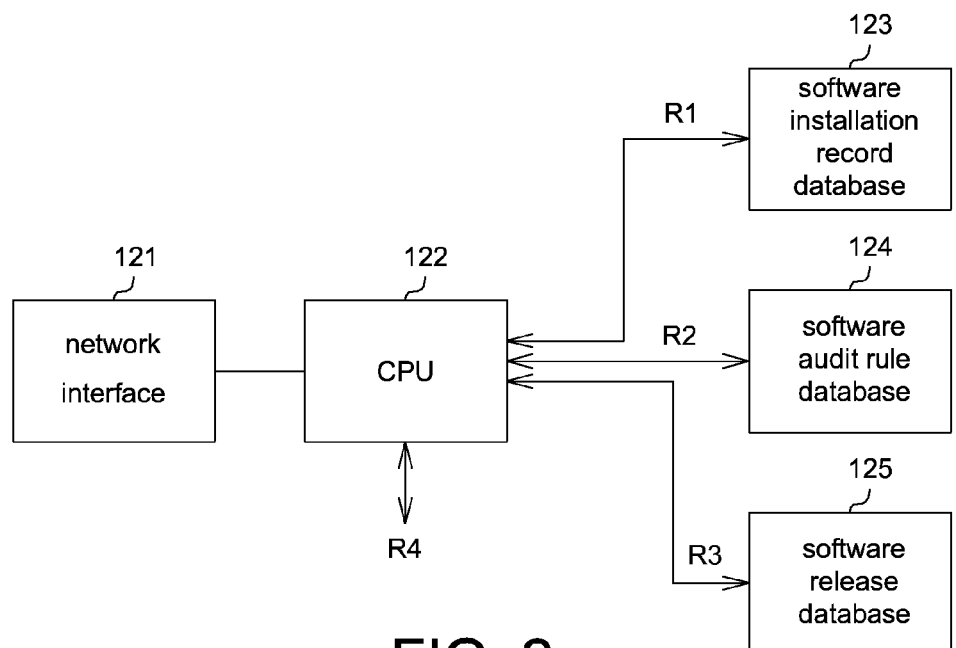
FIG. 2 is a block diagram of a server according to a first embodiment.
Figure 3:
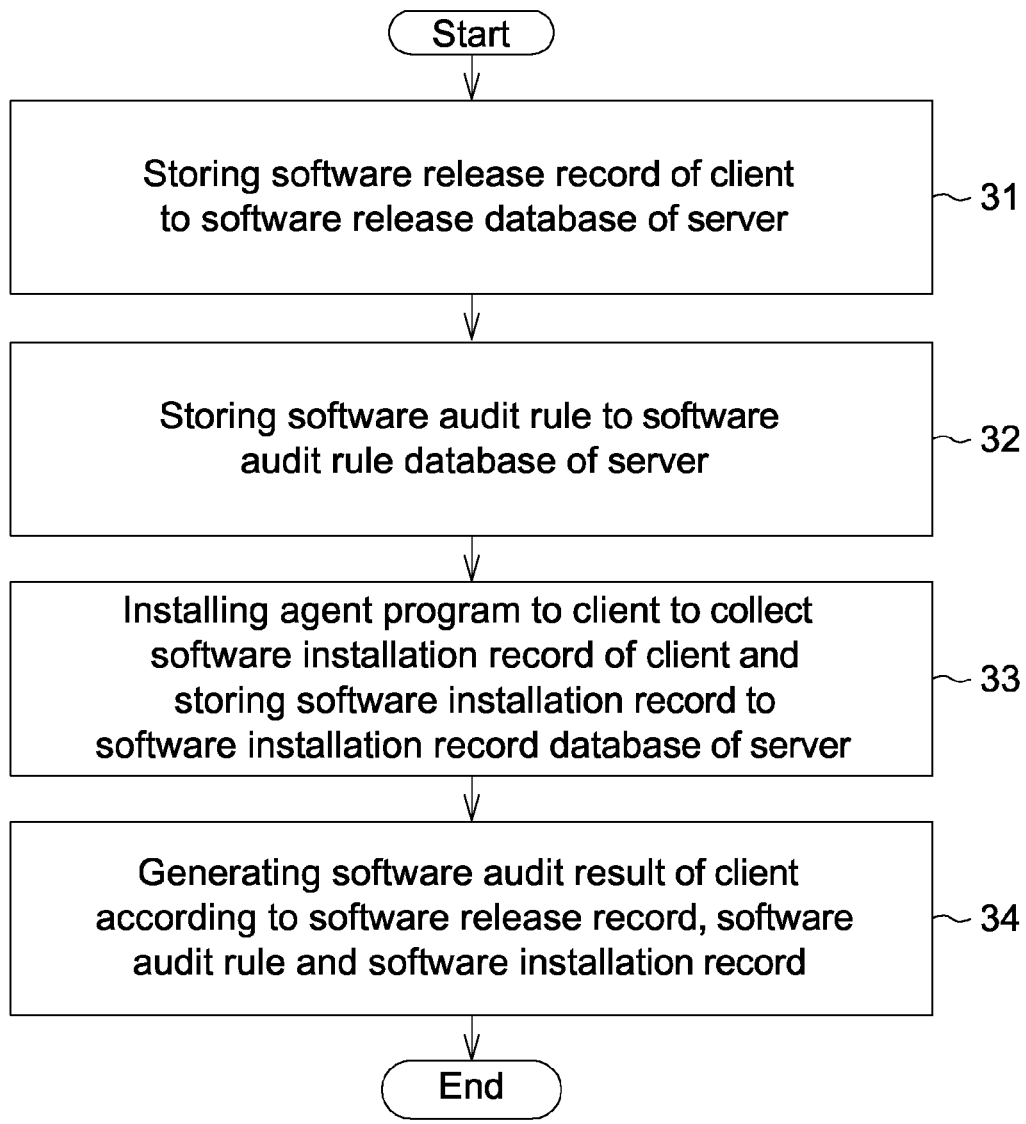
FIG. 3 is a flowchart of an automatic software audit method according to a first embodiment.

FIG. 1 shows a schematic diagram of an automatic audit system according to a first embodiment; FIG. 2 shows a block diagram of a server according to the first embodiment; FIG. 3 shows a flowchart of an automatic software audit method according to the first embodiment. Referring to FIGS. 1 to 3, an automatic software audit system 1 includes a client 11 and a server 12. The server 12 communicates with the client 11 via a network 13. For illustration purposes, only one client 11 is depicted in FIG. 1. In an alternative embodiment, multiple clients 11 may be included.

In FIG. 2, a server 12a is taken as an example of the server 12. The server 12a includes a network interface 121, a central processing unit (CPU) 122, a software installation record database 123, a software audit rule database 124, a software release database 125. The network interface 121 is coupled to the client 11 via the network 13. The automatic software audit method, applicable to the foregoing automatic software audit system 1, includes the following steps. In step 31, a software release record R3 of the client 11 is stored to the software release database 125 of the server 12a. The software release record R3 chiefly includes a software code, a user name, a start time and an end time.

In step 32, the CPU 122 stores a software audit rule R2 to the software audit rule database 124 of the server 12a. The software audit rule R2 chiefly includes a main file name, a main file description and a main file message-digest algorithm 5 (MD5). The software audit rule R2 may further include a software code, an installation path, a file size and a license method.

In step 33, the CPU 122 installs an agent program to the client 11 to collect a software installation record R1 of the client 11, and stores the software installation record R1 to the software installation record database 123. The software installation record R1 chiefly includes a software name, a path name and a main file MD5, and a license method. The license method may be a registry key, a license file, a license server or free software. The software installation record R1 may further include a software version, a software developer, a user name, a main file name, a main file size, and a main file description.

In step 34, the CPU 122 generates a software audit result R4 according to the software release record R3, the software audit rule R2 and the software installation record R1. The software audit result R4 chiefly includes a software code, a user name, a computer name and an audit time.

Second Embodiment

Figure 4:
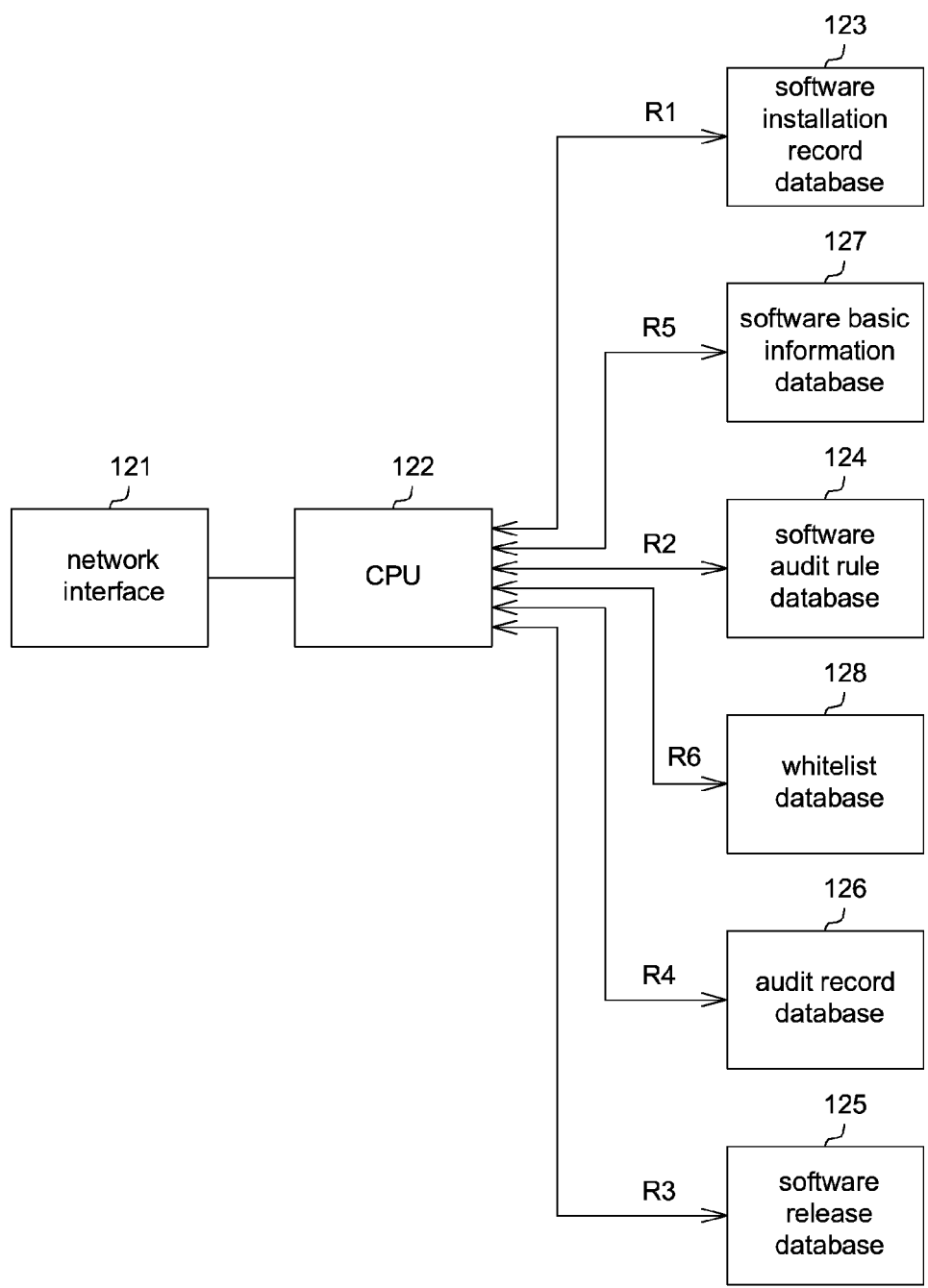
FIG. 4 is a block diagram of a server according to a second embodiment.

FIG. 4 shows a block diagram of a server according to a second embodiment. Referring to FIGS. 2 and 4, a main difference of the second embodiment from the first embodiment is that, a server 12b further includes an audit record database 126, a software basic information database 127 and a whitelist database 128. The CPU 122 stores a software audit result R4 to the audit record database 126. The audit record database 126 records and files the software audit result R4 for future issue retrospection and inquiry.

The CPU 122 stores software basic information R5 of software to be audited to the software basic information database 127. The software basic information R5 chiefly includes a software type, a software name, a software version, a software developer and a software code. Thus, the CPU 122 is allowed to establish the software audit rule R2 further according to the software basic information R5.

The CPU 122 stores a whitelist R6 to the whitelist database 128. The whitelist R6 chiefly includes a user code, a user name, a start time and an end time. The CPU 122 determines whether to audit the client 11 according to the whitelist R6. When a user from the client 11 matches a user name recorded in the whitelist R6, the CPU 122 does not audit the client 11. For example, trial-version software and test software may be recorded into the whitelist R6, and a user carrying out the trial or a user of a project application may also be included into the whitelist R6. The CPU 122 is allowed to more accurately generate the software audit result R4 through the whitelist R6.

Further, the CPU 122 may also inspect whether the software audit rule R2 is complete according to user feedback information. When the software audit rule R2 is incomplete, the CPU 122 modifies the software audit rule R2 according to the feedback information. For example, when the software audit result R4 indicates that a large number of users utilize piracy software, it implies that the software check rule R2 is incomplete.

As the software audit rule R2 and the software installation record R1 both include a license method, the CPU 122 may further perform in-depth comparison. For example, a user applies for certain software and receives the software released from the server 12b, and installs an illegal license file to a native at the client 11. Since the license methods are different, the CPU 122 is capable of concluding the illegal use at the client 11 through comparison.

Therefore, the automatic software audit system 1 and the automatic software audit method are capable of safeguarding against illegal use of software and precluding piracy software. Further, the automatic software audit system 1 and the automatic software audit method offer centralized management on internal software properties and utilization conditions in an enterprise to promote management convenience.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An automatic software audit system, comprising:
   a client; and
   a server, comprising:
   a network interface, for coupling to the client;
   a software installation record database, for storing a software installation record of the client;
   a software audit rule database, for storing a software audit rule;
   a software release database, for storing a software release record of the client; and
   a central processing unit (CPU), for installing an agent to the client to collect the software installation record, and generating a software audit result of the client according to the software installation record, the software audit rule and the software release record;
   wherein the CPU inspects whether the software audit rule is complete according to feedback information, and modifies the software audit rule according to the feedback information when the software audit rule is incomplete.

2. The automatic software audit system according to claim 1, wherein the server further comprises:
   an audit record database, for storing the software audit result.

3. The automatic software audit system according to claim 2, wherein the software audit result comprises a software code, a user name, a computer name and an audit time.

4. The automatic software audit system according to claim 1, wherein the server further comprises a software basic information database for storing software basic information of software to be audited; and the CPU establishes the software audit rule according to the software basic information.

5. The automatic software audit system according to claim 4, wherein the software basic information comprises a software type, a software name, a software version, a software developer and a software code.

6. The automatic software audit system according to claim 1, wherein the server further comprises a whitelist database for storing a whitelist; and the CPU determines whether to perform software audit on the client according to the whitelist.

7. The automatic software audit system according to claim 6, wherein the whitelist comprises a software code, a user name, a start time and an end time.

8. The automatic software audit system according to claim 1, wherein the software installation record comprises a software name, a path name, a main file message-digest algorithm (MD5) and a license method.

9. The automatic software audit system according to claim 8, wherein the software installation record further comprises a software version, a software developer, a user name, a main file name, a main file size and a main file description.

10. The automatic software audit system according to claim 1, wherein the software audit rule comprises a main file name, a main file description and a main file MD5.

11. The automatic software audit system according to claim 10, wherein the software audit rule further comprises a software code, an installation path, a main file size and a license method.

12. The automatic software audit system according to claim 1, wherein the software release record comprises a software code, a user name, a start time and an end time.

13. An automatic software audit method, comprising:
   storing a software release record of a client to a software release database of a server;
   storing a software audit rule to a software audit rule database of the server;
   installing an agent program to the client to collect a software installation record of the client, and storing the software installation record to a software installation record database of the server;

generating a software audit result of the client according to the software installation record, the software audit rule and the software release record;

inspecting whether the software audit rule is complete according to feedback information; and modifying the software audit rule according to the feedback information when the software audit rule is incomplete.

14. The automatic software audit method according to claim 13, further comprising:

storing the software audit result to an audit result database.

15. The automatic software audit method according to claim 14, wherein the software audit result comprises a software code, a user name, a computer name and an audit time.

16. The automatic software audit method according to claim 13, wherein the server further comprises a software basic information database for storing software basic information of software to be audited; and the CPU establishes the software audit rule according to the software basic information.

17. The automatic software audit method according to claim 16, wherein the software basic information comprises a software type, a software name, a software version, a software developer and a software code.

18. The automatic software audit method according to claim 13, further comprising:

storing a whitelist to a whitelist database;

wherein, the CPU determines whether to perform software audit on the client according to the whitelist.

19. The automatic software audit method according to claim 18, wherein the whitelist comprises a software code, a user name, a start time and an end time.

20. The automatic software audit method according to claim 13, wherein the software installation record comprises a software name, a path name, a main file MD5 and a license method.

21. The automatic software audit method according to claim 20, wherein the software installation record further comprises a software version, a software developer, a user name, a main file name, a main file size and a main file description.

22. The automatic software audit method according to claim 13, wherein the software audit rule comprises a main file name, a main file description and a main file MD5.

23. The automatic software audit method according to claim 22, wherein the software audit rule further comprises a software code, an installation path, a main file size and a license method.

24. The automatic software audit method according to claim 13, wherein the software release record comprises a software code, a user name, a start time and an end time.

* * * * *